United States Patent
Tan et al.

(10) Patent No.: US 11,899,580 B2
(45) Date of Patent: Feb. 13, 2024

(54) CACHE SPACE MANAGEMENT METHOD AND APPARATUS

(71) Applicant: HUAWEI TECHNOLOGIES CO., LTD., Guangdong (CN)

(72) Inventors: Chunhua Tan, Chengdu (CN); Feng Xia, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/680,739

(22) Filed: Feb. 25, 2022

(65) Prior Publication Data
US 2022/0179785 A1  Jun. 9, 2022

Related U.S. Application Data

(63) Continuation of application No. PCT/CN2020/106503, filed on Aug. 3, 2020.

(30) Foreign Application Priority Data

Aug. 26, 2019  (CN) .......................... 201910790109.2

(51) Int. Cl.
*G06F 12/06* (2006.01)

(52) U.S. Cl.
CPC .. *G06F 12/0646* (2013.01); *G06F 2212/1021* (2013.01); *G06F 2212/1044* (2013.01); *G06F 2212/601* (2013.01)

(58) Field of Classification Search
None
See application file for complete search history.

(56) References Cited

U.S. PATENT DOCUMENTS

| | | | |
|---|---|---|---|
| 5,696,932 A * | 12/1997 | Smith | G06F 12/0842 711/E12.039 |
| 9,921,963 B1 | 3/2018 | Li et al. | |
| 9,996,542 B2 | 6/2018 | Koltsidas | |
| 2007/0083711 A1 | 4/2007 | Bradford et al. | |
| 2007/0214325 A1* | 9/2007 | Sasamoto | G06F 12/0862 711/137 |

(Continued)

FOREIGN PATENT DOCUMENTS

| | | |
|---|---|---|
| CN | 102763070 A | 10/2012 |
| CN | 103902474 A | 7/2014 |

(Continued)

OTHER PUBLICATIONS

Cai Tao et al., "Storage Caching Sub-system for Cloud Application", Computer Science, vol. 41, No. 4, Apr. 2014, with a partial English machine translation, total 10 pages.

*Primary Examiner* — Charles J Choi
(74) *Attorney, Agent, or Firm* — WOMBLE BOND DICKINSON (US) LLP (57) ABSTRACT

A cache space management method and apparatus are disclosed. In the method, first, a hit rate of the read cache of the storage system is obtained; and then, a size of the read cache and a size of the metadata cache are adjusted based on the hit rate of the read cache. In the foregoing technical solution, the size of the read cache and the size of the metadata cache are dynamically adjusted by using the hit rate of the read cache as a decision factor. For example, when the hit rate of the read cache is relatively high, the size of the read cache may be increased.

18 Claims, 4 Drawing Sheets

(56) References Cited

U.S. PATENT DOCUMENTS

2012/0221774 A1* 8/2012 Atkisson ............. G06F 12/0895
  711/135
2018/0232310 A1  8/2018 Chang et al.
2019/0004952 A1  1/2019 Wang et al.

FOREIGN PATENT DOCUMENTS

| CN | 105868124 A | 8/2016 |
| CN | 109344092 A | 2/2019 |
| CN | 110688062 A | 1/2020 |

\* cited by examiner

| Data | Mark |
|---|---|
| Data 1 | Mark 2 |
| Data 2 | Mark 2 |
| Data 3 | Mark 1 |
| Data 4 | Mark 2 |
| Data 5 | Mark 1 |
| Data 6 | Mark 1 |
| Data 7 | Mark 1 |
| Data 8 | Mark 1 |
| Data 9 | Mark 1 |
| Data 10 | Mark 1 |

CACHE SPACE MANAGEMENT METHOD AND APPARATUS

CROSS-REFERENCE TO RELATED APPLICATIONS

This application is a continuation of International Application No. PCT/CN2020/106503, filed on Aug. 3, 2020, which claims priority to Chinese Patent Application No. 201910790109.2, filed on Aug. 26, 2019. The disclosures of the aforementioned applications are hereby incorporated by reference in their entireties.

TECHNICAL FIELD

This application relates to the field of storage technologies, and in particular, to a cache space management method and apparatus.

BACKGROUND

In a storage system, data stored in the storage system is usually cached. In this way, after a data read request is received, to-be-read data may be obtained from a cache, thereby reducing data read latency and improving data read performance.

A data cache includes two forms: a read cache and a metadata cache. The read cache caches data, and the metadata cache caches metadata of the data. When the data read request hits the read cache, the storage system directly obtains to-be-read data from the read cache. When the data read request hits the metadata cache, the storage system first obtains metadata of the to-be-read data from the metadata cache, and then obtains the to-be-read data from a corresponding storage device based on the metadata.

However, in the storage system, a total size of a cache space occupied by read data and a cache space occupied by metadata is limited. Compared with the metadata cache, the read cache has lower data read latency. Compared with the read cache, the metadata cache can cache metadata of more data when the read cache and the metadata cache occupy a same cache space. Therefore, how to properly set sizes of cache spaces occupied by the read cache and the metadata cache is a vital factor affecting data read performance of the storage system.

SUMMARY

This application provides a cache space management method and apparatus, to properly set a size of a cache space occupied by a read cache and a size of a cache space occupied by a metadata cache, so as to improve data read performance of a storage system.

According to a first aspect, a cache space management method is provided. The method may be applied to a storage system. The storage system includes a read cache and a metadata cache. The read cache is configured to cache data stored in the storage system. The metadata cache is configured to cache metadata corresponding to the data stored in the storage system. During execution of the method, first, a hit rate of the read cache of the storage system is obtained; and then, a size of the read cache and a size of the metadata cache are adjusted based on the hit rate of the read cache.

In an embodiment, the size of the read cache and the size of the metadata cache are dynamically adjusted by using the hit rate of the read cache as a decision factor. For example, when the hit rate of the read cache is relatively high, the size of the read cache may be increased. In this way, a large amount of data is to be obtained from the read cache, so that data read latency can be reduced as low as possible. When the hit rate of the read cache is relatively low, the size of the read cache may be decreased to leave a cache space for the metadata cache to increase a data volume of metadata, thereby improving data read performance of the cache system.

Further, dynamically adjusting the sizes of the read cache and the metadata cache can improve utilization of a cache space of the storage system.

In an embodiment, the hit rate of the read cache includes a prefetch hit rate or a repeated hit rate. The prefetch hit rate is a ratio of a data volume of to-be-read data obtained by a prefetch operation within preset duration to a total data volume of data prefetched by the prefetch operation within the preset duration; and the repeated hit rate is a ratio of a data volume of to-be-read data obtained from cached data within the preset duration to a total data volume of the cached data, and the to-be-read data is data corresponding to a data read request received by the storage system.

In this embodiment, the hit rate of the read cache may be represented by using the prefetch hit rate or the repeated hit rate. Therefore, flexibility of the solution is improved.

In a possible design, the adjusting a size of the read cache and a size of a metadata cache based on the hit rate of the read cache may include, but is not limited to, the following three manners:

In a first manner, if the hit rate of the read cache is represented by using the prefetch hit rate, when the prefetch hit rate is greater than or equal to a first threshold, the read cache is decreased and the metadata cache is increased.

In an embodiment, a data volume that can be cached by each prefetch operation is limited. For example, each prefetch operation can cache 10 megabytes (MB). Therefore, the read cache can implement a relatively high hit rate only by using a relatively small cache space, so that the size of the read cache can be reduced, and a remaining cache space is reserved for the metadata cache. The data read performance of the storage system is improved by increasing the data volume of the cached metadata.

In a second manner, if the hit rate of the read cache is represented by using the repeated hit rate, when the repeated hit rate is greater than or equal to a second threshold, the read cache is increased and the metadata cache is decreased.

In an embodiment, a higher repeated hit rate indicates a larger probability of obtaining the to-be-read data from the cached data. Therefore, the cache space occupied by the read cache may be increased to further improve the repeated hit rate, so that the data read performance of the storage system can be improved.

In a third manner, after the hit rate of the read cache is obtained, a minimum value of the read cache when data read latency of the storage system is less than or equal to a third threshold may be determined based on the hit rate of the read cache. Then, the size of the read cache is adjusted to the minimum value, and the size of the metadata cache is adjusted to a difference between a cache size of the storage system and the minimum value. It should be noted that the cache size may be a constant value, for example, may be a preset threshold; and the cache size of the storage system is a sum of the size of the read cache and the size of the metadata cache.

In an embodiment, a minimum cache space required by the read cache when a requirement on the data read latency of the system is met may be calculated based on the hit rate of the read cache. Then, the cache space occupied by the read cache is adjusted to the minimum cache space, so that a remaining cache space is reserved for the metadata cache. In this way, metadata can be cached as much as possible while ensuring the requirement on latency, and the data read performance of the storage system can be improved.

The first threshold, the second threshold, the third threshold, and the preset threshold are not limited in this application.

According to a second aspect, a cache space management apparatus is provided. The cache space management apparatus may be a storage node or a storage server, or may be an apparatus in a storage node or a storage server. The cache space management apparatus includes a processor, configured to implement the method described in the first aspect. The cache space management apparatus may further include a memory, configured to store program instructions and data. The memory is coupled to the processor. The processor may invoke and execute the program instructions stored in the memory to implement the method described in the first method. The cache space management apparatus may further include a communication interface. The communication interface is used by the cache space management apparatus to communicate with another device. For example, the another device is a client in a storage system.

In an embodiment, the cache space management apparatus includes the processor and the communication interface.

The communication interface is configured to obtain a hit rate of a read cache of a storage system.

The processor is configured to adjust a size of the read cache and a size of a metadata cache based on the hit rate of the read cache, where the storage system includes the read cache and the metadata cache, the read cache is configured to cache data stored in the storage system, and the metadata cache is configured to cache metadata corresponding to the data stored in the storage system.

For a description of the hit rate of the read cache, refer to the first aspect. Details are not described herein again.

In an embodiment, the processor is configured to:
when the prefetch hit rate is greater than or equal to a first threshold, decrease the read cache and increase the metadata cache.

In an embodiment, the processor is configured to:
when the repeated hit rate is greater than or equal to a second threshold, increase the read cache and decrease the metadata cache.

In an embodiment, the processor is configured to:
determine a minimum value of the read cache based on the hit rate of the read cache when data read latency of the storage system is less than or equal to a third threshold; and
adjust the size of the read cache to the minimum value, and adjust the size of the metadata cache to a difference between a cache size of the storage system and the minimum value, where the cache size of the storage system is a sum of the size of the read cache and the size of the metadata cache, and the cache size is a preset threshold.

According to a third aspect, a cache space management apparatus is provided. The cache space management apparatus may be a storage node or a storage server, or may be an apparatus in a storage node or a storage server. The cache space management apparatus may include a processing module and a communication module. These modules may perform corresponding functions performed in any design example of the first aspect. Details are as follows:

The communication module is configured to obtain a hit rate of a read cache of a storage system.

The processing module is configured to adjust a size of the read cache and a size of a metadata cache based on the hit rate of the read cache, where the storage system includes the read cache and the metadata cache, the read cache is configured to cache data stored in the storage system, and the metadata cache is configured to cache metadata corresponding to the data stored in the storage system.

According to a fourth aspect, an embodiment of this application provides a computer readable storage medium. The computer readable storage medium stores a computer program. The computer program includes program instructions. When the program instructions are executed by a computer, the computer is enabled to perform the method according to any possible design of the first aspect.

According to a fifth aspect, an embodiment of this application provides a computer program product. The computer program product stores a computer program. The computer program includes program instructions. When the program instructions are executed by a computer, the computer is enabled to perform the method according to any possible design of the first aspect.

According to a sixth aspect, this application provides a chip system. The chip system includes a processor, and may further include a memory, configured to implement the method according to the first aspect. The chip system may include a chip, or may include a chip and another discrete device.

According to a seventh aspect, an embodiment of this application provides a storage system. The storage system includes a storage device and the cache space management apparatus according to any design of the second aspect or the second aspect, or the storage system includes a storage device and the cache space management apparatus according to any design of the third aspect or the third aspect.

For beneficial effects of the second aspect to the seventh aspect and the implementations thereof, refer to the descriptions of the beneficial effects of the method and the implementations of the first aspect.

DESCRIPTION OF EMBODIMENTS

To make the objectives, technical solutions and advantages of the embodiments of this application clearer, the following further describes the embodiments of this application in detail with reference to the accompanying drawings.

In the embodiments of this application, "a plurality of" means two or more. In view of this, in the embodiments of this application, "a plurality of" may also be understood as "at least two". "At least one" may be understood as one or more, for example, one, two, or more. For example, including at least one means including one, two, or more, and the included ones are not limited. For example, including at least one of A, B, and C may be including A-B-C, A-B, A-C, B-C, A, B, or C. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In the embodiments of this application, "node" and "node" may be used interchangeably.

Unless otherwise indicated, ordinal terms such as "first" and "second" mentioned in the embodiments of this application are used to distinguish between a plurality of objects, but are not used to limit a sequence, a time sequence, priorities, or importance of the plurality of objects.

The method in the embodiments of this application may be applied to a storage system. The storage system may be a distributed storage system or a centralized storage system. The storage system may be a file storage system, a block storage system, an object storage system, or a combination of the foregoing storage systems. This is not limited in the embodiments of this application.

Figure 1:
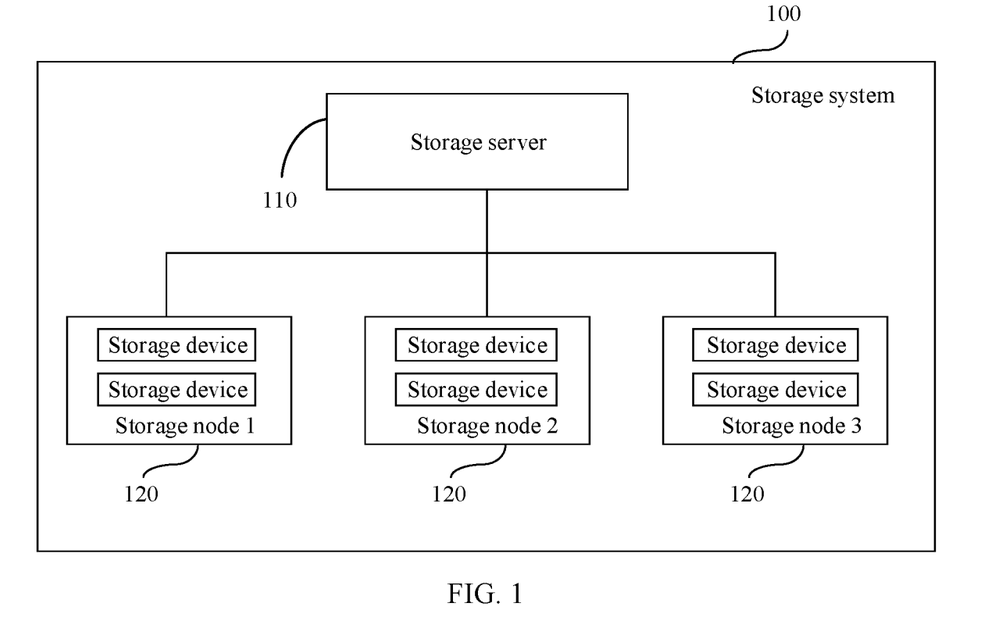
FIG. 1 is an architectural diagram of an example of a storage system according to an embodiment of this application.

The following describes the method in the embodiments of this application by using an example in which the storage system is a distributed storage system. FIG. 1 is an architectural diagram of an example of a storage system according to an embodiment of this application. In FIG. 1, the storage system 100 includes one server 110 and three storage nodes 120 (which are a storage node 1 to a storage node 3). Each storage node 120 includes at least one storage device. The storage device may be a hard disk drive (HDD), a solid state drive (SSD), or the like. An interface of the storage device may include a serial advanced technology attachment (SATA) interface, a small computer system interface (SCSI), a serial attached SCSI interface (SAS), a fiber channel (FC) interface, an interface that supports a non-volatile memory express (NVMe) protocol, or the like.

A part of a cache space may be reserved in the server 110, each storage node 120, or a management node in the plurality of storage nodes 120 as a read cache and a metadata cache. The read cache is configured to cache data stored in the storage system 100. The metadata cache is configured to cache metadata corresponding to the data stored in the storage system 100. For ease of description, a cache space reserved in the server end 110 is used as the read cache and the metadata cache below. That the read cache is configured to cache the data stored in the storage system 100 means that the read cache is configured to cache the data stored in the storage system 100 and related to a read request. A specific implementation may include data stored in the storage system 100 and accessed by the read request, and may further include data related to data that is stored in the storage system 100, that is prefetched based on a prefetch algorithm, and that is accessed by the read request.

After receiving a read request sent by a client, the server 110 first determines whether the read cache includes to-be-read data corresponding to the read request, or determines whether the metadata cache includes metadata of to-be-read data corresponding to the read request. If the read cache has cached the to-be-read data, the to-be-read data is obtained from the read cache and fed back to the client. If the metadata cache includes the metadata corresponding to the to-be-read data, a storage address corresponding to the to-be-read data is determined based on the metadata corresponding to the to-be-read data to obtain the to-be-read data from the corresponding storage address. If the read cache does not include the to-be-read data and the metadata cache does not include the metadata corresponding to the to-be-read data either, the server 110 needs to search a plurality of storage devices of the storage system for the to-be-read data. As can be learned, latency of reading data by the client from the storage system 100 can be reduced by setting the read cache and the metadata cache, thereby improving data read performance of the storage system.

Because the read cache caches data and the metadata cache caches metadata (that is, an index of the data), a cache space occupied to cache data in a storage space is larger than a cache space occupied to cache metadata of the data in the storage space. In addition, latency of reading to-be-read data from the read cache is lower than latency of obtaining to-be-read data based on metadata. Therefore, when a cache space of the server 110 is limited, properly setting sizes of cache spaces occupied by the read cache and the metadata cache is a vital factor affecting the data read performance of the storage system.

The cache space management method provided in the embodiments of this application is described below with reference to the accompanying drawings.

Figure 2:
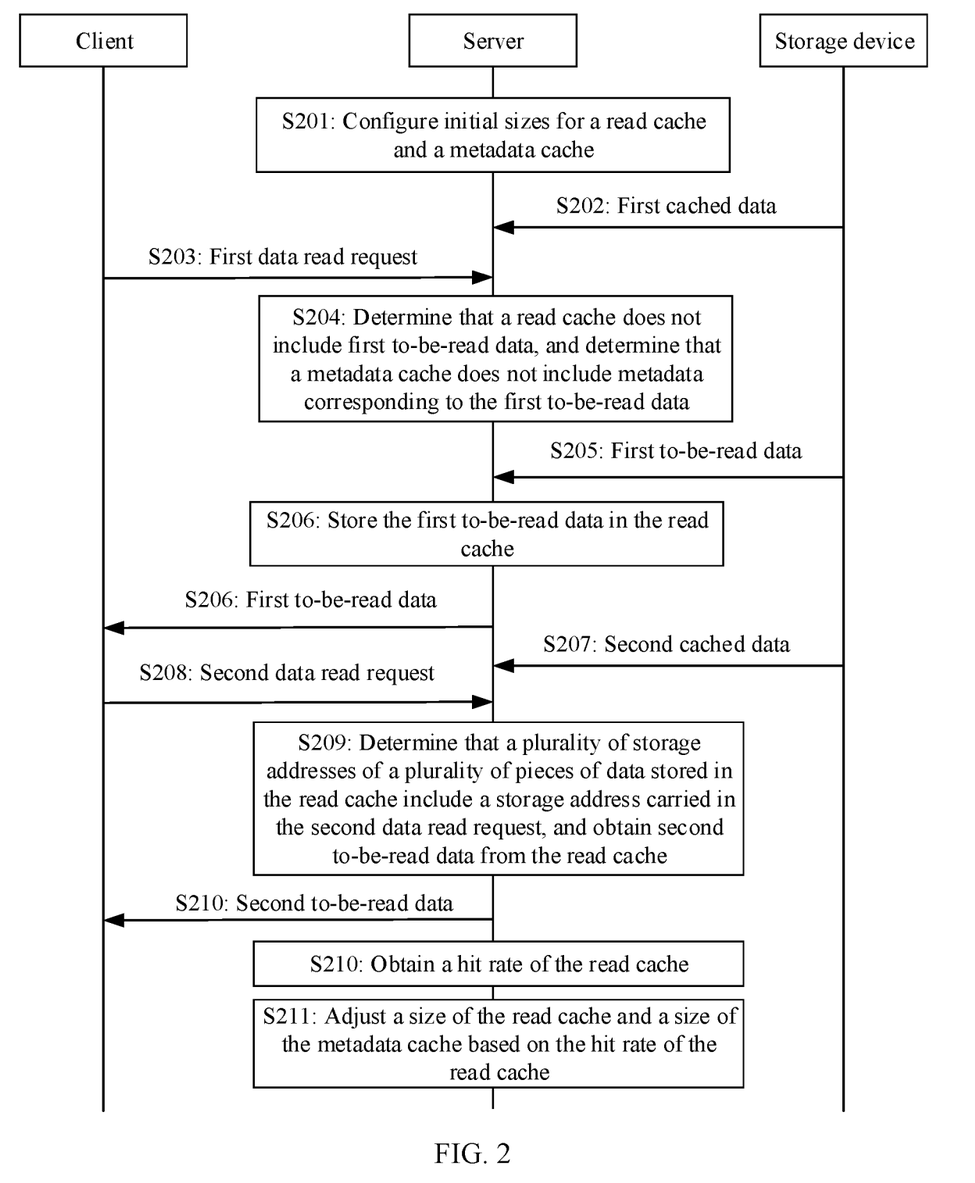
FIG. 2 is a flowchart of a cache space management method according to an embodiment of this application.

FIG. 2 is a flowchart of a cache space management method according to an embodiment of this application. An example in which the method is applied to the storage system as shown in FIG. 1 is used below. It should be noted that the cache space in the storage system may not only be used for the read cache and the metadata cache, but also may be used for a write cache or for caching program code required for running the storage system, and the like. The cache space in this embodiment of this application refers to a part of the cache space that is in the storage system and that is used only for the read cache and the metadata cache. The flowchart shown in FIG. 2 is described as follows:

S201: A server configures initial sizes for the read cache and the metadata cache.

After the storage system is powered on or started, the server sets sizes of cache spaces respectively occupied by the read cache and the metadata cache.

In an example, the server may prestore an initial value of the cache space occupied by the metadata cache. The initial value may be a relatively small value. For example, the initial value may be a size of a cache space required to cache root information of a storage pool (that is, all storage devices included in the storage system) of the storage system. Then, the server sets the size of the cache space occupied by the metadata cache to the initial value, and sets the size of the cache space occupied by the read cache to a difference between a total size of the cache space and the initial value.

Certainly, the server may alternatively prestore the initial value of the cache space occupied by the read cache; and then set, based on the initial value of the cache space occupied by the read cache, the sizes of the cache spaces respectively occupied by the read cache and the metadata cache. A specific process is similar to that in the foregoing example, and details are not described herein again.

S202: The server obtains first cached data from the storage device through a prefetch operation.

In an embodiment of this application, to reduce latency of reading data from the storage system, the server may prestore some data in the read cache through a prefetch operation before receiving a data read request sent by the client.

For example, the server may randomly choose to store the first cached data in the read cache. For example, if only 4 M of data can be read through each prefetch operation and a data volume stored in each logical unit (logical unit, LUN) is 2 M, the server may store data in an LUN 0 and LUN 1 into the read cache.

S203: The server receives a first data read request sent by the client.

The first data read request carries a storage address of first to-be-read data in the storage device. The storage address may be a logical address or a physical address. This is not limited herein. For ease of description, an example in which the storage address is a logical address is used below. For example, the storage address carried in the first data read request is an LUN 4.

S204: The server determines that the read cache does not include the first to-be-read data, and determines that the metadata cache does not include metadata corresponding to the first to-be-read data.

If the server determines that storage addresses of data stored in the read cache are the LUN 0 and the LUN 1, which are different from the storage address of the to-be-read data, the server determines that the read cache does not include the first to-be-read data. When the data read request sent by the client is received for the first time, because the metadata cache has not stored any data, the server determines that the metadata corresponding to the first to-be-read data does not exist in the metadata cache. In this case, it may be referred to as that the first data read request has not hit the read cache or the metadata cache.

S205: The server obtains the first to-be-read data from the storage device.

The server obtains the first to-be-read data from the corresponding storage device based on the storage address carried in the first data read request.

S206: The server sends the first to-be-read data to the client, and stores the first to-be-read data in the read cache.

The server may determine, according to a preset policy, whether to store the first to-be-read data in the read cache or store the metadata corresponding to the first to-be-read data in the metadata cache. This is not limited herein. In this embodiment of this application, an example in which the server stores the first to-be-read data in the read cache is used. So far, the read cache has stored the data corresponding to the LUN 0, the LUN 1, and the LUN 4.

S207: The server obtains second cached data from the storage device through a prefetch operation.

Operation S207 is similar to operation S202, and details are not described herein again. It should be noted that operation S207 is an optional operation, that is, operation S207 is not mandatory to be performed. For example, the server may determine, based on a usage requirement, whether operation S207 needs to be performed.

In an embodiment of this application, an example in which the server performs operation S207 is used. If the server performs operation S207 and determines that the storage address of the first to-be-read data is the LUN 4, the server stores data after the LUN 4, that is, data in an LUN 5 and an LUN 6, in the read cache. So far, the read cache has stored data in the LUN 0, the LUN 1, and the LUN 4 to the LUN 6.

S208: The server receives a second data read request sent by the client.

The second data read request carries a storage address of second to-be-read data in the storage device. In this embodiment of this application, an example in which the second to-be-read data is the same as the first to-be-read data is used. For example, the storage address of the second to-be-read data is the LUN 4.

S209: The server determines that a plurality of storage addresses of a plurality of pieces of data stored in the read cache include the storage address carried in the second data read request, and the server obtains the second to-be-read data from the read cache.

In this case, it may be referred to as that the second data read request has hits the read cache.

S210: The server sends the second to-be-read data to the client.

The server may repeatedly perform operation S202 to operation S210. A cache space used for the read cache and the metadata cache is limited in the server. Therefore, as a quantity of data read requests sent by the client increases, data volumes of data stored in the read cache in the server and metadata stored in the metadata cache in the server also increase. If a quantity of times for which data read requests hit the read cache is relatively small, in other words, most data cached in the read cache is useless for improving the data read performance of the storage system, the useless data wastes the cache space. If a quantity of times for which data read requests hit the read cache is relatively large, a larger cache space occupied by the read cache indicates a larger amount of data hitting the read cache, and the data read performance of the storage system can further be improved. However, because the server has set the initial value for the read cache, data cannot be cached after a data volume cached in the read cache reaches the initial value. To resolve the foregoing problem, this embodiment of this application further includes the following operation:

S211: The server obtains a hit rate of the read cache of the storage system.

In an embodiment of this application, the hit rate of the read cache may be represented by using a prefetch hit rate or a repeated hit rate. To clarify a difference between the prefetch hit rate and the repeated hit rate, the following describes data stored in the read cache.

As can be learned from operation S202 to operation S210, the data stored in the read cache may have two sources. The first source is data obtained by a prefetch operation, and the second source is data obtained by using the data read request sent by the client. Therefore, in this embodiment of this application, the server may further record a source of each piece of data.

Figure 3:
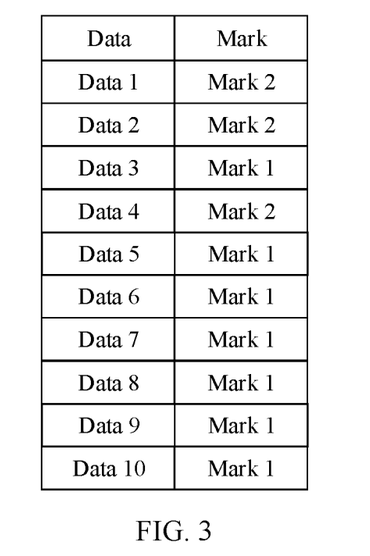
FIG. 3 is a schematic diagram of an example in which a server records a mapping relationship between each piece of data and a source according to an embodiment of this application.

In an example, the server may record a mapping relationship between each piece of data and a source. Referring to FIG. 3, the server records the mapping relationship by using a table. A mark 1 is used to represent that the data is obtained through a prefetch operation, and a mark 2 is used to represent that the data is obtained based on a data read request. In FIG. 3, the server records sources of ten pieces of data stored in the read cache, where data 1, data 2, and data 4 correspond to the mark 2; and data 3, and data 5 to data 10 correspond to the mark 1.

Figure 4:
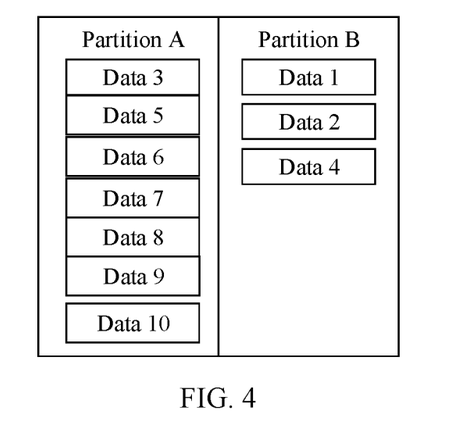
FIG. 4 is a schematic diagram of another example in which a server records a mapping relationship between each piece of data and a source according to an embodiment of this application.

In another example, the server may divide the read cache into two partitions, and different partitions store data of different sources. Referring to FIG. 4, a total size of the cache space occupied by the read cache is 200 M. The server divides the read cache into a partition A and a partition B. The partition A corresponds to a cache space of 0 M to 100 M, and the partition B corresponds to a cache space of 101 M to 200 M. The partition A is configured to store the data obtained through the prefetch operation. The partition A includes the data 3, and the data 5 to the data 10. The partition B is configured to store the data obtained based on the data read request. The partition B includes the data 1, the data 2, and the data 4.

Certainly, a source of each piece of data may alternatively be marked in other manners, which are not listed herein one by one.

If to-be-read data corresponding to a data read request is stored in the read cache and the data is obtained through a prefetch operation, it may be referred to as that the data read request hits prefetched data or may be referred to as a prefetch hit. If to-be-read data corresponding to a data read request is stored in the read cache and the data is obtained based on the data read request, in other words, the to-be-read data has been read before, it may be referred to as a repeated hit. If to-be-read data corresponding to a data read request has not been stored in the read cache, it may be referred to as a miss. The server may record a hit status of each data read request, and the hit status includes a prefetch hit, a repeated hit, or a miss.

Based on the foregoing concept, definitions of the prefetch hit rate and the repeated hit rate in the embodiments of this application are obtained. The prefetch hit rate is a ratio of a data volume of to-be-read data obtained by a prefetch operation within preset duration to a total data volume of data prefetched by the prefetch operation within the preset duration. For example, within the preset duration, the client has sent ten data read requests, and a total data volume of to-be-read data corresponding to the ten data read requests is 200 M. Then, the server obtains recorded hit statuses corresponding to the ten data read requests and determines that there are nine data read requests with a hit status of a prefetch hit in the ten data read requests, and a total data volume of to-be-read data corresponding to the nine data read requests is 160 M, thereby obtaining that the prefetch hit rate is 160/200=80% within the preset duration.

The repeated hit rate is a ratio of a data volume of to-be-read data obtained from cached data within the preset duration to a total data volume of the cached data. For example, a total data volume of data stored in the read cache is 200 M within the preset duration, and the client has sent ten data read requests within the preset duration. Then, the server obtains recorded hit statuses corresponding to the ten data read requests and determines that there are five data read requests with a hit status of a repeated hit in the ten data read requests, and a total data volume of to-be-read data corresponding to the five data read requests is 100 M, thereby obtaining that the repeated hit rate is 100/200=50% within the preset duration.

It should be noted that in this embodiment of this application, the preset duration may be set based on a use requirement, for example, may be one minute, five minutes, or like. This is not limited herein.

S212: The server adjusts a size of the read cache and a size of the metadata cache based on the hit rate of the read cache.

In an embodiment of this application, operation S212 may include, but is not limited to, the following three implementations. In a specific implementation process, one of the three implementations may be selected for execution.

In a first manner, the server uses a prefetch hit rate to represent the hit rate of the read cache, and the adjusting a size of the read cache and a size of the metadata cache based on the hit rate of the read cache includes:

when the prefetch hit rate is greater than or equal to a first threshold, decreasing the read cache and increasing the metadata cache.

A data volume that can be cached by each prefetch operation is limited. For example, each prefetch operation can obtain 10 MB of data, and the data obtained by the prefetch operation can be written to the cache space. In this case, the read cache can implement a relatively high hit rate only by using a relatively small cache space, so that the size of the read cache can be reduced, and a remaining cache space is reserved for the metadata cache. The data read performance of the storage system is improved by increasing the data volume of the cached metadata.

In an embodiment, the server may prestore the first threshold. For example, the first threshold is 60%, and after the prefetch hit rate of the read cache is obtained, the prefetch hit rate is compared with the first threshold. For example, the foregoing example is used, and the prefetch hit rate is 80%, which is greater than 60%. Therefore, the server determines to decrease the read cache and increase the metadata cache. The server may perform adjustment based on a preset step size. For example, the step size may be set to 50 MB. When determining that the read cache needs to be decreased, the server decreases a current value of the cache space occupied by the read cache by a value corresponding to the step size. Correspondingly, the cache space decreased from the read cache is configured for the metadata cache. Alternatively, the server may determine, based on a current value of the cache space occupied by the read cache, a cache space that needs to be decreased. For example, the server may decrease the size of the read cache by a constant ratio, where the constant ratio may be 20%.

It should be noted that if a total size of cache spaces used for and the read cache and the metadata cache is specified in the server, when one cache (the read cache or the metadata cache) is decreased, the other cache is necessarily increased. Therefore, in this embodiment of this application, the read cache may be decreased and the metadata cache may be increased in the following manners: In a first manner, the read cache is decreased, and the metadata cache is naturally increased. In a second manner, the metadata cache is increased, and the read cache is naturally decreased. In a third manner, the read cache is decreased and the metadata cache is increased at the same time.

In a second manner, the server uses a repeated hit rate to represent the hit rate of the read cache, and the adjusting a size of the read cache and a size of the metadata cache based on the hit rate of the read cache includes:

when the repeated hit rate is greater than or equal to a second threshold, increasing the read cache and decreasing the metadata cache.

A higher repeated hit rate of the read cache indicates a larger probability of obtaining the to-be-read data from the cached data. Therefore, the cache space occupied by the read cache may be increased to further improve the repeated hit rate, so that the data read performance of the storage system can be improved.

In an embodiment, the server may prestore the second threshold. For example, the second threshold is 40%, and after the repeated hit rate of the read cache is obtained, the repeated hit rate is compared with the second threshold. For example, the foregoing example is used, and the repeated hit rate of the read cache is 50%, which is greater than 40%. Therefore, the server determines to increase the read cache and decrease the metadata cache. A manner in which the server increases the read cache and decreases the metadata cache is similar to the corresponding content in the first manner, and details are not described herein again.

It should be noted that the first threshold and the second threshold may be the same or may be different. When the first threshold and the second threshold are different, the server may store a correspondence between a first threshold and a prefetch hit rate and a correspondence between a second threshold and a repeated hit rate, so that the server can determine a to-be-used threshold by using the correspondence.

In a third manner, the server may use either of the repeated hit rate or the prefetch hit rate to represent the hit rate of the read cache, and the adjusting a size of the read cache and a size of the metadata cache based on the hit rate of the read cache includes:

First, a minimum value of the read cache when data read latency of the storage system is less than or equal to a third threshold is determined based on the hit rate of the read cache. Then, the size of the read cache is adjusted to the minimum value, and the size of the metadata cache is adjusted to a difference between a cache size of the storage system and the minimum value. The cache size of the storage system is a total size of cache spaces used for the read cache and the metadata cache in the storage system.

In this manner, a minimum cache space required by the read cache when a requirement on the data read latency of the system is met may be calculated based on the hit rate of the read cache. Then, the cache space occupied by the read cache is adjusted to the minimum cache space, so that a remaining cache space is reserved for the metadata cache. In this way, metadata can be cached as much as possible while ensuring the requirement on latency, and the data read performance of the storage system can be improved.

In an embodiment, the server may further obtain the hit rate of the metadata cache and miss rates of missing hitting the metadata cache and the read cache within the preset duration. A specific obtaining manner is similar to the manner for obtaining the hit rate of the read cache, and details are not described herein again. A formula of calculating latency required by the storage system to read data is obtained by using the hit rate of the read cache and the hit rate and the miss rate of the metadata cache.

Assuming that a total volume of data obtained by the storage system within the preset duration by using a data read request is z, the hit rate of the read cache is dy, and the hit rate of the metadata cache is my, the miss rate is (1−dy−my). When the data read request hits the read cache, latency required to obtain the to-be-read data is dx. When the data read request hits the metadata cache, latency required to obtain the to-be-read data is mx. When the data read request misses hitting, latency required to obtain the to-be-read data from the storage device is nx, and a quantity of data read requests concurrently processed by the storage system is c. In this case, a method for calculating a total time t spent by the storage system in reading data satisfies the following formula:

$$t=z*(1/c)*(dx*dy+mx*my+nx*(1-dy-my)) \quad (1)$$

Usually, a value of dx is approximately 10 microseconds (μs), a value of mx approximately ranges from 200 μs to 1 millisecond (ms), and a value of nx is usually two or three times the value of mx.

In a given storage system, c, dx, mx, and nx are constants, and dy and my are variables because the size of the read cache is different from the size of the metadata cache. That is, an expression between dy or my and the size of the read cache may be established. For example, the following formula can be obtained:

$$dy=f1(x) \quad (2)$$

$$my=f2(x) \quad (3)$$

where the parameter x represents the size of the read cache, f1(x) is a mapping relationship between the size of the read cache and dy, f2(x) is a mapping relationship between the size of the read cache and my, and details are not described herein.

The minimum value of the capacity of the read cache is obtained while ensuring that t is less than or equal to the third threshold. Then, the server adjusts the size of the read cache from the initial value to the minimum value, and a remaining cache space is used for the metadata cache.

The server may periodically perform operation S211 and operation S212, so that proper sizes of cache spaces can be configured for the read cache and the metadata, thereby ensuring the data read performance of the storage system.

Adjusting the size of the read cache and the size of the metadata cache based on the hit rate of the read cache means that the size of the read cache and the size of the metadata cache are allocated based on the hit rate of the read cache when a sum of the size of the read cache and the size of the metadata cache is determined. In another implementation, adjusting the size of the read cache and the size of the metadata cache means that the storage system has increased the cache size, and the size of the read cache and the size of the metadata cache are allocated based on the hit rate of the read cache and a value by which the cache size is increased.

In an embodiment, the size of the read cache and the size of the metadata cache are dynamically adjusted by using the hit rate of the read cache as a decision factor. For example, when the hit rate of the read cache is relatively high, the size of the read cache may be increased. In this way, a large amount of data is to be obtained from the read cache, so that data read latency can be reduced as low as possible. When the hit rate of the read cache is relatively low, the size of the read cache may be decreased to leave a cache space for the metadata cache to increase a data volume of metadata, thereby improving data read performance of the cache system.

It should be noted that in the foregoing embodiment, an example in which the hit rate of the read cache is used as the decision factor is used to describe the cache space management method in the embodiments of this application. In another embodiment, the hit rate of the metadata cache may alternatively be used as the decision factor to manage the cache space. A specific process is similar to that in the foregoing embodiment, and details are not described herein again. In addition, in the embodiment shown in FIG. 2, in a distributed storage system scenario, the method is performed by a server of a distributed storage system; and in a storage array scenario, the method is performed by an array controller of a storage array.

In addition, it should be noted that in the foregoing embodiment, an example in which the method is applied to a cache space management scenario is used. The method may alternatively be applied to other resource sharing scenarios, for example, a scenario of sharing a storage space of a storage device. Examples are not provided one by one herein.

In the foregoing embodiment provided in this application, to implement the functions in the method provided in the embodiment of this application, the storage system may include a hardware structure and/or a software module. The foregoing functions are implemented in a form of a hardware structure, a software module, or a hardware structure plus a software module. Whether a function in the foregoing functions is performed in a manner of a hardware structure, a software module, or a hardware structure plus a software module depends on a specific application and a design constraint of a technical solution.

Figure 5:
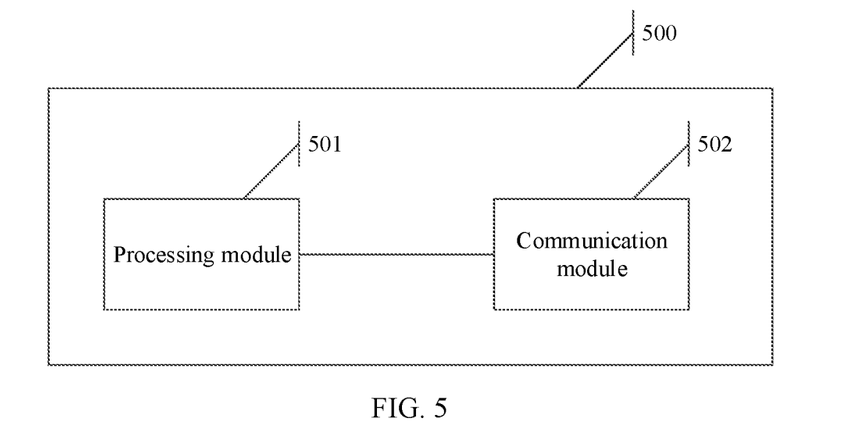
FIG. 5 is a structural diagram of an example of a cache space management apparatus according to an embodiment of this application.

FIG. 5 is a schematic structural diagram of a cache space management apparatus 500. The cache space management apparatus 500 may be configured to implement a function of a server of a distributed storage system, or may be configured to implement a function of an array controller of a storage array. The cache space management apparatus 500 may be a hardware structure, a software module, or a hardware structure plus a software module. The cache space management apparatus 500 may be implemented by a chip system. In this embodiment of this application, the chip system may include a chip, or may include a chip and another discrete device.

The cache space management apparatus 500 may include a processing module 501 and a communication module 502.

The processing module 501 may be configured to perform operation S201, operation S204, operation S206, and operation S209 to operation S211 in the embodiment shown in FIG. 2, and/or configured to support another process of the technology described in this specification.

The communication module 502 may be configured to perform operation S202 to operation S203, operation S205 to operation S208, and operation S210 in the embodiment shown in FIG. 2, and/or configured to support another process of the technology described in this specification. The communication module 502 is configured for the cache space management apparatus 500 to communicate with another module. The communication module 502 may be a circuit, a component, an interface, a bus, a software module, a transceiver, or any other apparatus that can implement communication.

All related content of the operations in the foregoing method embodiment may be referenced to functional descriptions of corresponding functional modules, and details are not described herein again.

The module division in the embodiment shown in FIG. 5 is an example, and is merely logical function division. During actual implementation, another division manner may be used. In addition, the functional modules in the embodiments of this application may be integrated into one processor, or may exist separately physically. Alternatively, two or more modules may be integrated into one module. The integrated module may be implemented in a form of hardware, or may be implemented in a form of a software functional module.

Figure 6:
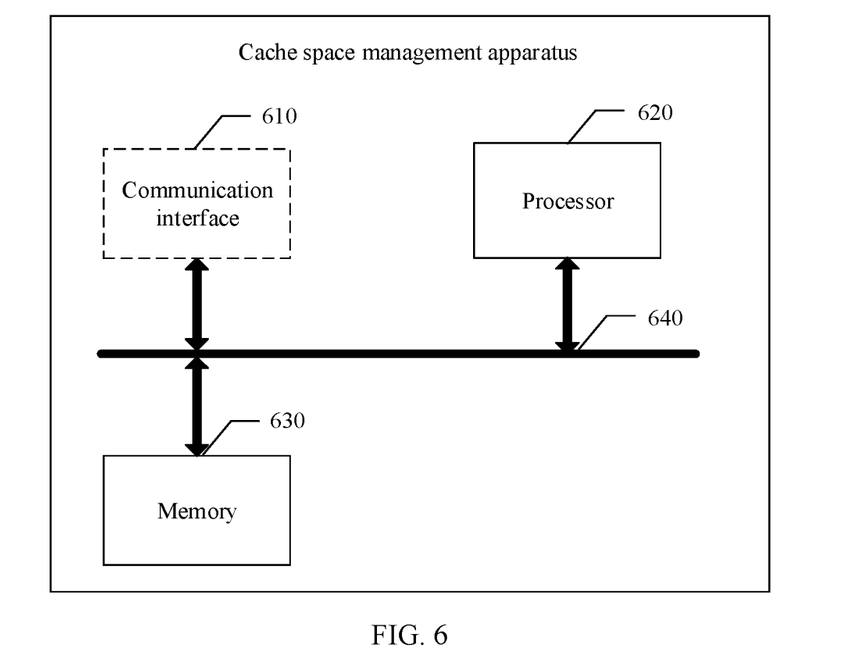
FIG. 6 is a structural diagram of another example of a cache space management apparatus according to an embodiment of this application.

FIG. 6 shows a cache space management apparatus 600 provided in an embodiment of this application. The cache space management apparatus 600 may be configured to implement a function of a server of a distributed storage system, or may be configured to implement a function of an array controller of a storage array. The cache space management apparatus 600 may be a chip system. In this embodiment of this application, the chip system may include a chip, or may include a chip and another discrete device.

The cache space management apparatus 600 includes at least one processor 620, configured to implement or support the cache space management apparatus 600 in implementing a function of the storage server in the method provided in the embodiments of this application. For example, the processor 620 may adjust a size of a read cache and a size of a metadata cache. For details, refer to the detailed description in the method example. Details are not described herein again.

The cache space management apparatus 600 may further include at least one memory 630, configured to store program instructions and/or data. The memory 630 is coupled to the processor 620. The coupling in this embodiment of this application is an indirect coupling or communication connection between apparatuses, units, or modules; may be an electrical, mechanical, or another form; and is used for information exchange between apparatuses, units, or modules. The processor 620 may cooperate with the memory 630. The processor 620 may execute the program instructions stored in the memory 630. At least one of the at least one memory may be included in the processor.

The cache space management apparatus 600 may further include a communication interface 610, configured to communicate with another device by using a transmission medium, so that the cache space management apparatus 600 may communicate with the another device. For example, the another device may be a storage client or a storage device. The processor 620 may send and receive data by using the communication interface 610.

A specific connection medium between the communication interface 610, the processor 620, and the memory 630 is not limited in this embodiment of this application. In this embodiment of this application, the memory 630, the processor 620, and the communication interface 610 are connected by using a bus 650 in FIG. 6. The bus is indicated by using a bold line in FIG. 6. A connection manner between other components is merely an example for description, and is not limited by reference. The bus may be classified into an address bus, a data bus, a control bus, and the like. For ease of representation, only one thick line is used to represent the bus in FIG. 6, but this does not mean that there is only one bus or only one type of bus.

In the embodiments of this application, the processor 620 may be a general processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general purpose processor may be a microprocessor or any conventional processor or the like. The operations of the method disclosed with reference to the embodiments of this application may be directly performed by a hardware processor, or may be performed by using a combination of hardware in the processor and a software module.

In this embodiment of this application, the memory 630 may be a non-volatile memory, for example, a hard disk drive (HDD) or a solid state drive (SSD); or may be a volatile memory, for example, a random access memory (RAM). The memory is, but is not limited to, any other medium capable of carrying or storing desired program code in a form of instructions or data structures and capable of being accessed by a computer. The memory in this embodiment of this application may alternatively be a circuit or any other apparatus that can implement a storage function, and is configured to store program instructions and/or data.

An embodiment of this application further provides a computer readable storage medium, including instructions. When the instructions are run on a computer, the computer is enabled to perform the method performed by the server in the embodiment shown in FIG. 2.

An embodiment of this application further provides a computer program product, including instructions. When the instructions are run on a computer, the computer is enabled to perform the method performed by the server in the embodiment shown in FIG. 2.

An embodiment of this application provides a chip system. The chip system includes a processor, and may further include a memory, configured to implement a function of the server in the foregoing method. The chip system may include a chip, or may include a chip and another discrete device.

An embodiment of this application provides a storage system. The storage system includes a storage device and the server in the embodiment shown in FIG. 2.

All or some of the foregoing methods in the embodiments of this application may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, a network device, a user device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

What is claimed is:

1. A method for managing cache space, comprising:
obtaining a hit rate of a read cache of a storage system; and
adjusting a size of the read cache and a size of a metadata cache based on the hit rate of the read cache, wherein the storage system comprises the read cache and the metadata cache, the read cache is configured to cache data stored in the storage system, and the metadata cache is configured to cache metadata that is generated from one or more data read requests corresponding to the data stored in the storage system.

2. The method according to claim 1, wherein the hit rate of the read cache comprises a prefetch hit rate or a repeated hit rate; the prefetch hit rate is a ratio of a data volume of to-be-read data obtained by a prefetch operation within preset duration to a total data volume of data prefetched by the prefetch operation within the preset duration; and the repeated hit rate is a ratio of a data volume of to-be-read data obtained from cached data within the preset duration to a total data volume of the cached data, and the to-be-read data is data corresponding to one of the one or more data read requests received by the storage system.

3. The method according to claim 2, wherein adjusting the size of the read cache and the size of the metadata cache based on the hit rate of the read cache comprises:
when the prefetch hit rate is greater than or equal to a first threshold, decreasing the read cache and increasing the metadata cache.

4. The method according to claim 1, further comprising:
when the hit rate is greater than or equal to a second threshold, increasing the read cache and decreasing the metadata cache.

5. The method according to claim 1, wherein adjusting the size of the read cache and the size of the metadata cache based on the hit rate of the read cache comprises:
determining a minimum value of the read cache based on the hit rate of the read cache when data read latency of the storage system is less than or equal to a third threshold; and
adjusting the size of the read cache to the minimum value, and adjusting the size of the metadata cache to a difference between a cache size of the storage system and the minimum value, wherein the cache size of the storage system is a sum of the size of the read cache and the size of the metadata cache, and the cache size is a preset threshold.

6. The method according to claim 1, wherein adjusting the size of the read cache and the size of the metadata cache based on the hit rate of the read cache comprises:
allocating some space from the read cache to the metadata cache; or
allocating some space from the metadata cache to the read cache.

7. An apparatus for managing cache space, comprising:
a communication interface configured to obtain a hit rate of a read cache of a storage system; and
a processor configured to adjust a size of the read cache and a size of a metadata cache based on the hit rate of the read cache, wherein the storage system comprises the read cache and the metadata cache, the read cache is configured to cache data stored in the storage system, and the metadata cache is configured to cache metadata that is generated from one or more data read requests corresponding to the data stored in the storage system.

8. The apparatus according to claim 7, wherein the hit rate of the read cache comprises a prefetch hit rate or a repeated hit rate; the prefetch hit rate is a ratio of a data volume of to-be-read data obtained by a prefetch operation within preset duration to a total data volume of data prefetched by the prefetch operation within the preset duration; and the repeated hit rate is a ratio of a data volume of to-be-read data obtained from cached data within the preset duration to a total data volume of the cached data, and the to-be-read data is data corresponding to one of the one or more data read requests received by the storage system.

9. The apparatus according to claim 8, wherein the processor is configured to:
when the prefetch hit rate is greater than or equal to a first threshold, decrease the read cache and increase the metadata cache.

10. The apparatus according to claim 7, wherein the processor is configured to:
when the hit rate is greater than or equal to a second threshold, increase the read cache and decrease the metadata cache.

11. The apparatus according to claim 7, wherein the processor is configured to:
determine a minimum value of the read cache based on the hit rate of the read cache when data read latency of the storage system is less than or equal to a third threshold; and
adjust the size of the read cache to the minimum value, and adjust the size of the metadata cache to a difference between a cache size of the storage system and the minimum value, wherein the cache size of the storage system is a sum of the size of the read cache and the size of the metadata cache, and the cache size is a preset threshold.

12. The apparatus according to claim 7, wherein the processor is configured to:
    allocate some space from the read cache to the metadata cache; or
    allocate some space from the metadata cache to the read cache.

13. A non-transitory computer program product storing instructions, which when executed on a computer, cause the computer to perform operations of:
    obtaining a hit rate of a read cache of a storage system; and
    adjusting a size of the read cache and a size of a metadata cache based on the hit rate of the read cache, wherein the storage system comprises the read cache and the metadata cache, the read cache is configured to cache data stored in the storage system, and the metadata cache is configured to cache metadata that is generated from one or more data read requests corresponding to the data stored in the storage system.

14. The non-transitory computer program product according to claim 13, wherein the hit rate of the read cache comprises a prefetch hit rate or a repeated hit rate; the prefetch hit rate is a ratio of a data volume of to-be-read data obtained by a prefetch operation within preset duration to a total data volume of data prefetched by the prefetch operation within the preset duration; and the repeated hit rate is a ratio of a data volume of to-be-read data obtained from cached data within the preset duration to a total data volume of the cached data, and the to-be-read data is data corresponding to one of the one or more data read requests received by the storage system.

15. The non-transitory computer program product according to claim 14, wherein adjusting the size of the read cache and the size of the metadata cache based on the hit rate of the read cache comprises:
    when the prefetch hit rate is greater than or equal to a first threshold, decreasing the read cache and increasing the metadata cache.

16. The non-transitory computer program product according to claim 13, wherein adjusting the size of the read cache and the size of the metadata cache based on the hit rate of the read cache comprises:
    when the hit rate is greater than or equal to a second threshold, increasing the read cache and decreasing the metadata cache.

17. The non-transitory computer program product according to claim 13, wherein adjusting the size of the read cache and the size of the metadata cache based on the hit rate of the read cache comprises:
    determining a minimum value of the read cache based on the hit rate of the read cache when data read latency of the storage system is less than or equal to a third threshold; and
    adjusting the size of the read cache to the minimum value, and adjusting the size of the metadata cache to a difference between a cache size of the storage system and the minimum value, wherein the cache size of the storage system is a sum of the size of the read cache and the size of the metadata cache, and the cache size is a preset threshold.

18. The non-transitory computer program product according to claim 13, wherein adjusting the size of the read cache and the size of the metadata cache based on the hit rate of the read cache comprises:
    allocating some space from the read cache to the metadata cache; or
    allocating some space from the metadata cache to the read cache.

* * * * *